United States Patent [19]

Suzuki et al.

[11] Patent Number: 4,505,354

[45] Date of Patent: Mar. 19, 1985

[54] FRONT BRAKE TUBE RETAINING STRUCTURE FOR AUTOMOTIVE VEHICLE

[75] Inventors: Takashi Suzuki, Zama; Syuzi Yamagata, Yokohama; Jyunji Osako, Zama, all of Japan

[73] Assignee: Nissan Motor Company, Limited, Yokohama, Japan

[21] Appl. No.: 387,815

[22] Filed: Jun. 14, 1982

[30] Foreign Application Priority Data

Jun. 18, 1981 [JP] Japan .................................. 56-94329

[51] Int. Cl.³ ............................................ B60T 17/04
[52] U.S. Cl. ..................................... 180/297; 137/355;
138/107; 296/198; 248/60; 403/194
[58] Field of Search ....................... 180/297, 89.1, 308;
296/194, 203, 198; 280/668, 666, 667; 138/107,
106, 110; 137/355, 351; 403/194, 197, 201;
16/2, 108, 109; 248/60, 56

[56] References Cited

U.S. PATENT DOCUMENTS 3,851,672 12/1974 DeVincent et al. ................. 138/106
3,885,767 5/1975 Olowinski et al. ..................... 248/56
4,264,101 4/1981 Gotoh .................................. 296/194

4,353,578 10/1982 Knapp ................................ 180/89.1

FOREIGN PATENT DOCUMENTS 2474985 8/1981 France .

OTHER PUBLICATIONS

*Automotive Suspension Steering and Brakes*, by Ellinger and Hathaway, Prentic Hall Inc. ©1980.
European Search Report, EP 82 105375.8, Aug. 18, 1982.

Primary Examiner—David M. Mitchell
Attorney, Agent, or Firm—Schwartz, Jeffery, Schwaab, Mack, Blumenthal & Koch

[57] ABSTRACT

A front brake tube is arranged to pass under an arch portion of a hood ledge for thereby extending between the inside and outside of an engine compartment. A support is provided which has an upper end attached to the hood ledge at a location adjacent the arch portion and a lower end projecting downwardly from the arch portion for retaining thereat the brake tube. The support is located close to a vertical reference plane extending across the vehicle and containing the axis of a drive shaft extending across the hood ledge.

8 Claims, 7 Drawing Figures

FRONT BRAKE TUBE RETAINING STRUCTURE FOR AUTOMOTIVE VEHICLE

BACKGROUND OF THE INVENTION

1. Field of the Invention

The present invention relates to a structure for retaining or holding a front brake tube in place on a body of an automotive vehicle, particularly a front-wheel-drive vehicle having an engine at the front (hereinlater will be referred to simply as an F-F vehicle).

2. Description of the Prior Art

In F-F vehicles, as exemplarily shown in FIGS. 1 and 2, a hood ledge 10 is formed with a relatively large arch portion 12 for installation of a drive shaft 14. On the outside surface of the hood ledge 10 there is mounted a bracket 16 for supporting an end of a brake tube 18 equipped with a connector 20, as better shown in FIG. 3. The end of the brake tube 18 is connected by the connector 20 to an end of a brake hose 22. The other end of the brake hose 22 is connected to a wheel cylinder (not shown). The brake tube 18 extends, through an aperture 24 formed in the hood ledge 10 and fitted with a grommet 26, into an engine compartment 28 for connection with a master cylinder (not shown).

In such prior art structure, the aperture 24 is formed at the place where the inside surface of the hood ledge 10 is not covered by any vehicle body structural member such as a side member 30 or a hood ledge reinforcing member (not shown) so that the aperture 24 is open directly into the engine compartment 28 to enable the brake hose 20 to be installed in an easy and simple manner. For this reason, the location of the aperture 24 is very limited, and actually the aperture 24 has been formed at such a place that is spaced from the arch portion 12 and rearward of the bracket 16 which is also located adjacent the arch portion 12, as shown in FIG. 2.

The foregoing construction and arrangement, however, encounters a drawback in that it is possible for the brake tube 18 to be touched or engaged by a front wheel 32 in a maximumly steered state, as illustrated in dash-and-dot line in FIG. 4, and to be broken thereby in the worst case. This is particularly true when the vehicle is of the type having a transversely mounted engine since, in such type of vehicle, the distance between the hood ledge and the front wheel tends to be made small due to the need of a wide engine compartment. Furthermore, when the wheel 32 is equipped with a tire chain, there will inevitably be a large possibility that the brake tube 18 will be touched or struck by the tire chain.

In FIGS. 3 and 4, indicated by the reference numeral 34 is a front suspension, by 36 a front fender and by 38 a fender protector.

SUMMARY OF THE INVENTION

In accordance with the present invention, there is provided a novel and improved front brake tube retaining structure for use in an automotive vehicle, particularly an F-F vehicle.

The front brake tube retaining structure comprises a hood ledge defining the inside and outside of an engine compartment and having an arch portion for installation of a drive shaft extending across the hood ledge, a support having an upper end attached to the hood ledge at a location adjacent the arch portion and a lower end projecting downwardly from the arch portion, and a brake tube arranged to pass under the arch portion of the hood ledge for thereby extending between the inside and outside of the engine compartment and retained by the support at the lower end thereof.

This structure completely eliminate the problems noted above without increasing the manufacturing and assembling expense.

It is accordingly an object of the present invention to provide a novel and improved front brake tube retaining structure for an automotive vehicle which is free from the drawbacks noted above.

It is another object of the present invention to provide a novel and improved front brake tube retaining structure of the above described character which can completely eliminate the dangerous possibility existing in the prior art structure as noted above.

BRIEF DESCRIPTION OF THE DRAWINGS

The features and advantages of the front brake tube retaining structure according to the present invention will become more clearly appreciated from the following description taken in conjunction with the accompanying drawings, in which.

DESCRIPTION OF THE PREFERRED EMBODIMENT

Figure 1:
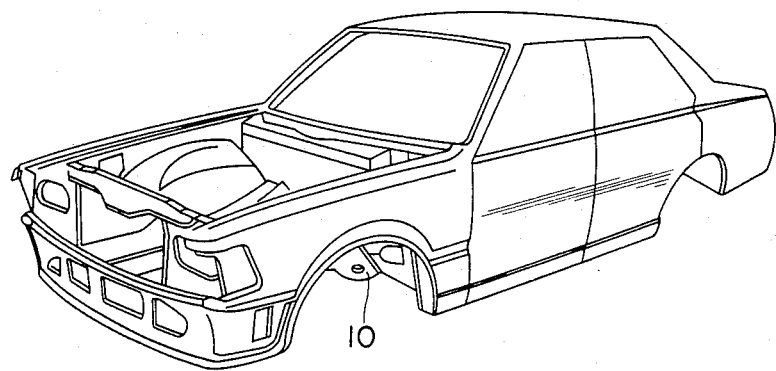
FIG. 1 is a perspective view of an automotive vehicle body to which a brake tube retaining structure is adapted for connection.
Figure 2:
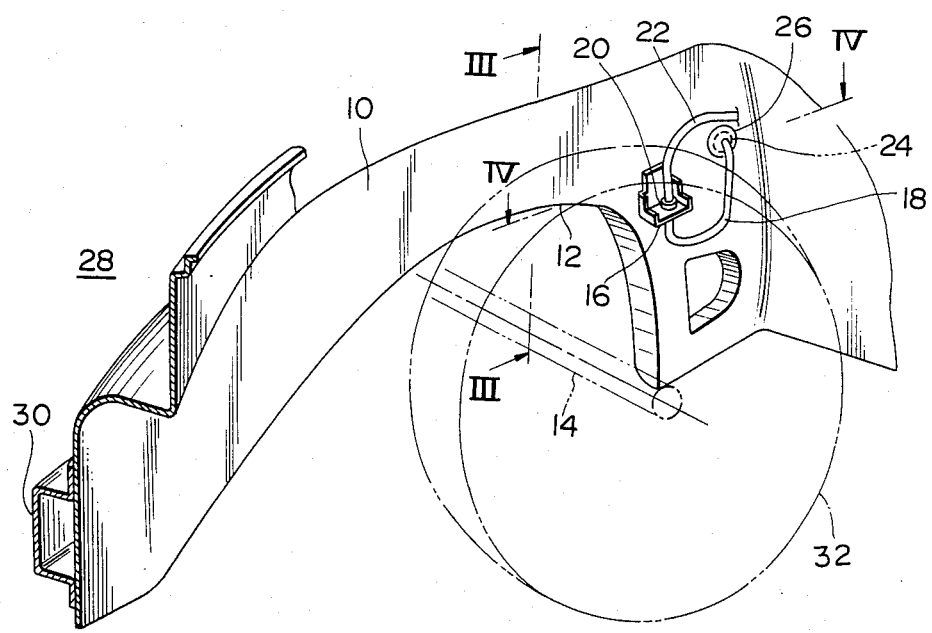
FIG. 2 is a perspective view of a prior art brake tube retaining structure for an automotive vehicle, with some adjacent parts of the vehicle being omitted.
Figure 3:
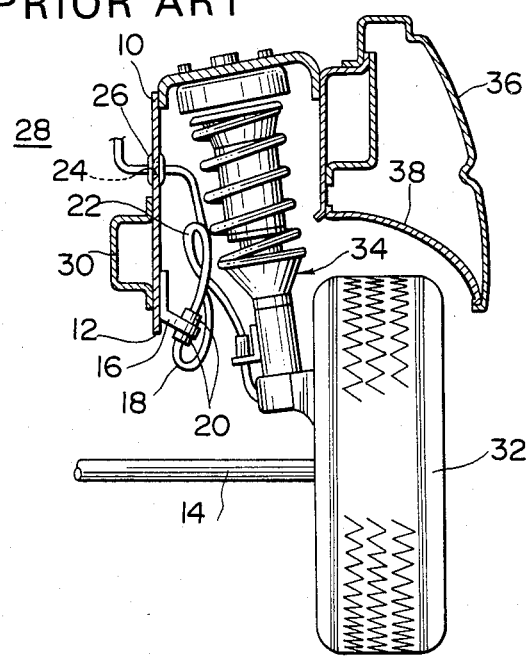
FIG. 3 is a sectional view taken along the line III—III of FIG. 2.
Figure 4:
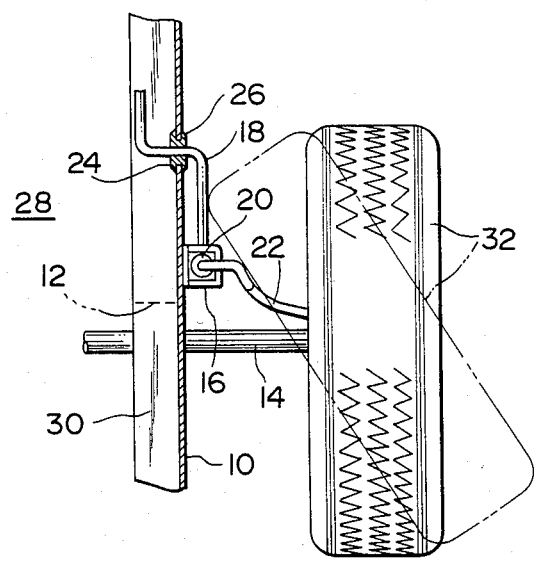
FIG. 4 is a sectional view taken along the line IV—IV of FIG. 2.
Figure 5:
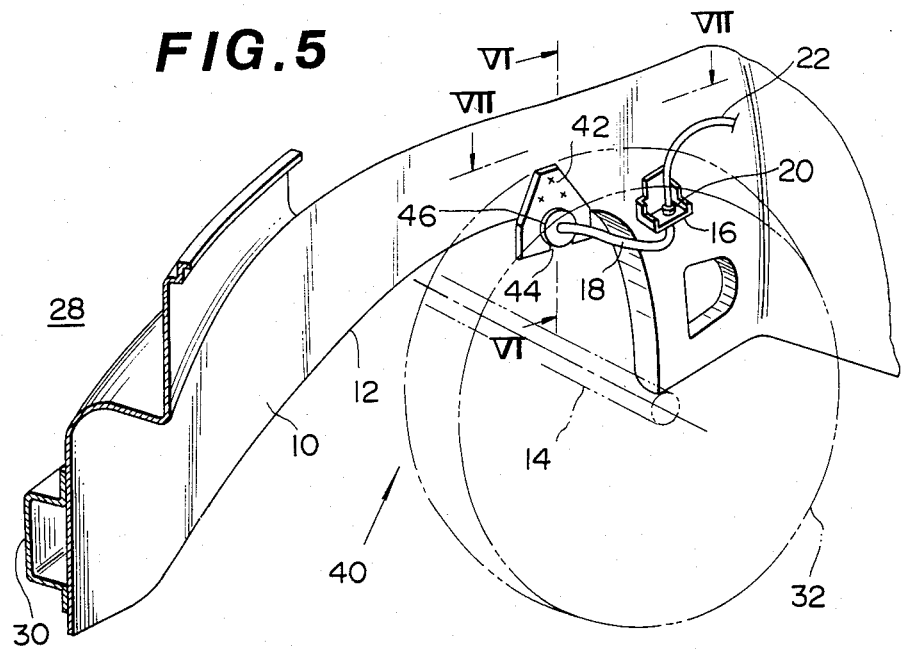
FIG. 5 is a perspective view of a front brake tube retaining structure for an automotive vehicle according to the present invention, with some adjacent parts of the vehicle being omitted.
Figure 6:
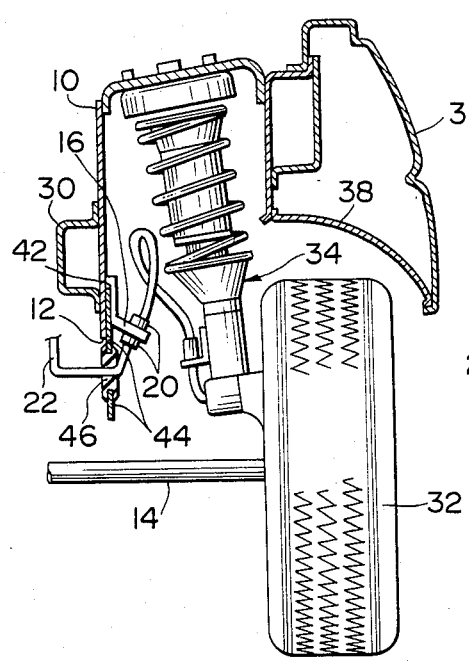
FIG. 6 is a sectional view taken along the line VI—VI of FIG. 5.
Figure 7:
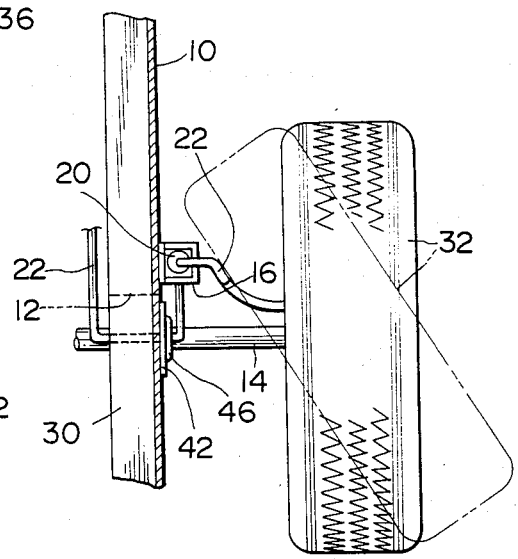
FIG. 7 is a sectional view taken along the line VII—VII of FIG. 5.

Referring now to FIGS. 5 through 7, inclusive, in which like parts to those of the prior art structure are designated by like reference characters, a brake tube retaining structure according to an embodiment of the present invention is generally indicated at 40 and shown to comprise a support 42 in the form of a piece of flat plate attached at the upper end thereof to the hood ledge 10 to depend downwardly therefrom. The support 42 has a cut or notch 44 at the lower end portion thereof projecting downwardly from the arch portion 12. The cut 44 is shaped to have a circular portion and a narrow throat portion so that a grommet 46 is securely fitted in the cut 44. The bracket 16 is located adjacent the arch portion 12 similarly to that in the conventional structure. In other words, the bracket 16 is located adjacent the arch portion 12 and rearward of a vertical reference plane extending across the vehicle body and containing the axis of the drive shaft 14. The support 42 is spot-welded or otherwise secured to the hood ledge 10 at the place adjacent to both the arch portion 12 and the above described reference plane. That is, the support 42 is so arranged as to be closer to the reference plane as compared with the bracket 16. Preferably, the support 42 is arranged to be contained or located in the reference plane, that is, the support 42 and the grommet 46 are arranged right above the drive shaft 14, for the reason as will be described hereinlater.

The brake tube 18 is arranged to pass under the arch portion 12 for connection at an end with the master cylinder within the engine compartment 28 and at the other end with the brake hose 22 outside of the engine compartment 28 and fixedly held at a portion under the arch portion 12 by the support 42. That is, the brake tube 18 is arranged to pass through the grommet 46 which is fitted in the cut 44 of the support 42.

With the foregoing structure of this invention, the brake tube 18 is assuredly prevented from being touched or engaged by the front wheel 32 since according to the present invention the brake tube 18 is now arranged considerably closer to the axis of the drive shaft 14 without requiring difficult and complicated assembly work and therefore without increasing the manufacturing and assembling expense. Further, when the support 42 and the grommet 46 are arranged right above the drive shaft 14, the distance between the support 42 and the front wheel 32 is maintained substantially constant without relation to the steered angle of the front wheel 32, thus completely eliminating such possibility as noted above, that is, the front wheel 32 is positively and assuredly prevented from being brought into contact with the support 42 and the grommet 46 as well as the brake tube 18.

Obviously, many variations and modifications of the present invention are possible in light of the above teachings. It is, therefore, to be understood that within the scope of the appended claims, the invention may be practiced otherwise than as specifically described.

What is claimed is:

1. A front brake tube retaining structure for an automotive vehicle, comprising a hood ledge defining the inside and outside of an engine compartment and having an arch portion for installation of a drive shaft extending across the hood ledge, a support having an upper end attached to said hood ledge at a location adjacent the arch portion and a lower end projecting downwardly from the arch portion, and a brake tube arranged to pass under the arch portion of the hood ledge for thereby extending between the inside and outside of the engine compartment and retained by said support at the lower end thereof.

2. A front brake tube retaining structure for an automotive vehicle as set forth in claim 1, in which said support is located close to a vertical reference plane extending across the vehicle and containing the axis of the drive shaft.

3. A front brake tube retaining structure for an automotive vehicle as set forth in claim 2, in which said support is located in said reference plane.

4. A front brake tube retaining structure for an automotive vehicle as set forth in claim 2, further comprising a bracket mounted on the outside surface of said hood ledge at a location adjacent said arch portion and retaining an end of the brake tube outside of the engine compartment for connection with a brake hose which is in turn connected with a wheel cylinder, in which said support is located closer to said reference plane than said bracket.

5. A front brake tube retaining structure for an automotive vehicle as set forth in claim 4, in which said brake tube has the other end within the engine compartment for connection with a master cylinder.

6. A front brake tube retaining structure for an automotive vehicle as set forth in claim 1, in which said support is in the form of a flat plate having at the lower end portion thereof a cut for receiving therein a grommet by way of which said brake tube is retained by said support.

7. A front brake tube retaining structure for an automotive vehicle as set forth in claim 1, in which said automotive vehicle is of the front-wheel-drive type having an engine at the front.

8. A front brake tube retaining structure for an automotive vehicle as set forth in claim 1, in which said automotive vehicle is of the front-wheel-drive type having a transversely mounted engine at the front.

* * * * *